United States Patent
Ranganathan et al.

(10) Patent No.: US 9,043,764 B2
(45) Date of Patent: May 26, 2015

(54) CROSS-PLATFORM COMPILER FOR DATA TRANSFORMS

(75) Inventors: Anand Ranganathan, Stamford, CT (US); Anton V. Riabov, Ossining, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 13/043,952

(22) Filed: Mar. 9, 2011

(65) Prior Publication Data

US 2014/0067750 A1 Mar. 6, 2014

(51) Int. Cl.
*G06F 9/45* (2006.01)
*G06F 17/30* (2006.01)

(52) U.S. Cl.
CPC .... *G06F 17/30563* (2013.01); *G06F 17/30592* (2013.01)

(58) Field of Classification Search
CPC ....................................................... G06F 8/51
See application file for complete search history.

(56) References Cited

U.S. PATENT DOCUMENTS

| | | | | |
|---|---|---|---|---|
| 6,453,464 | B1 * | 9/2002 | Sullivan | 717/137 |
| 6,629,313 | B1 * | 9/2003 | Rowe et al. | 717/136 |
| 7,080,361 | B2 * | 7/2006 | Aigen | 717/137 |
| 7,797,691 | B2 * | 9/2010 | Cockx et al. | 717/155 |
| 7,890,943 | B2 * | 2/2011 | Guo et al. | 717/160 |
| 8,078,357 | B1 * | 12/2011 | Trytten et al. | 701/36 |
| 8,127,269 | B2 * | 2/2012 | Hu et al. | 717/104 |
| 8,141,064 | B2 * | 3/2012 | Chipman | 717/154 |
| 2002/0100026 | A1 * | 7/2002 | Betros et al. | 717/136 |
| 2002/0144234 | A1 * | 10/2002 | Yeh | 717/106 |
| 2003/0172368 | A1 * | 9/2003 | Alumbaugh et al. | 717/106 |
| 2003/0188299 | A1 * | 10/2003 | Broughton et al. | 717/141 |
| 2003/0226133 | A1 * | 12/2003 | Grover | 717/140 |
| 2003/0233632 | A1 * | 12/2003 | Aigen et al. | 717/106 |
| 2004/0088685 | A1 * | 5/2004 | Poznanovic et al. | 717/140 |
| 2004/0254948 | A1 | 12/2004 | Yao | |
| 2005/0005261 | A1 * | 1/2005 | Severin | 717/108 |
| 2005/0066317 | A1 * | 3/2005 | Alda et al. | 717/136 |
| 2005/0144226 | A1 * | 6/2005 | Purewal | 709/203 |
| 2005/0243604 | A1 * | 11/2005 | Harken et al. | 365/185.22 |
| 2005/0251533 | A1 | 11/2005 | Harken et al. | |

(Continued)

OTHER PUBLICATIONS

"Stream Processing Application Declarative Engine", IBM, Retreived Apr. 7, 2014, <http://pic.dhe.ibm.com/infocenter/streams/v2r0/index.jsp?topic=%2Fcom.ibm.swg.im.infosphere.streams.whats-new.doc%2Fdoc%2Fibminfospherestreams-whats-new-spl.html> pp. 1-3.*

(Continued)

*Primary Examiner* — Thuy Dao
*Assistant Examiner* — Samuel Hayim
(74) *Attorney, Agent, or Firm* — Ryan, Mason & Lewis, LLP

(57) ABSTRACT

Techniques for automatically partitioning a multi-platform data transform flow graph to one or more target output platforms are provided. The techniques include performing type inference on a transform graph, wherein the transform graph comprises one or more data transforms, automatically partitioning the transform graph to one or more target output platforms based on one or more policies, performing an optimization of the partitioned transform graph, and generating code, from the partitioned transform graph, for each set of the one or more data transforms based on the one or more target output platforms.

25 Claims, 8 Drawing Sheets

(56) References Cited

U.S. PATENT DOCUMENTS

| | | | |
|---|---|---|---|
| 2005/0256892 A1 | 11/2005 | Harken | |
| 2005/0289520 A1* | 12/2005 | Overall | 717/137 |
| 2007/0011175 A1 | 1/2007 | Langseth et al. | |
| 2007/0027905 A1* | 2/2007 | Warren et al. | 707/103 R |
| 2007/0033582 A1* | 2/2007 | Hu et al. | 717/156 |
| 2007/0083850 A1 | 4/2007 | Kapoor et al. | |
| 2007/0256058 A1* | 11/2007 | Marfatia et al. | 717/137 |
| 2008/0147707 A1 | 6/2008 | Jin et al. | |
| 2008/0244512 A1* | 10/2008 | Guo et al. | 717/110 |
| 2008/0306986 A1* | 12/2008 | Doyle, Sr. | 707/102 |
| 2009/0043778 A1 | 2/2009 | Jambunathan et al. | |
| 2009/0172047 A1 | 7/2009 | Boyko et al. | |
| 2009/0177671 A1 | 7/2009 | Pellegrini et al. | |
| 2009/0320008 A1* | 12/2009 | Barsness et al. | 717/151 |
| 2010/0287529 A1* | 11/2010 | Costa et al. | 717/105 |
| 2012/0011152 A1* | 1/2012 | Gulwani et al. | 707/771 |

OTHER PUBLICATIONS

Kevin Borders et al., "Chimera: A Declarative Language for Streaming Network Traffic Analysis", National Security Agency, 2010, 2006, <https://www.usenix.org/system/files/conference/usenixsecurity12/sec12-final116.pdf>, [ages 1-15.*

C. Caalrls et al., "gorithmic Skeletons for Stream Programming in Embedded Heterogeneous Parallel Image Processing Applications", IEEE, 2006, <http://ieeexplore.ieee.org/stamp/stamp.jsp?tp=&arnumber=1639351>, pp. 1-9.*

William Thies et al., "An Empirical Characterization of Stream Programs and its Implications for Language and Compiler Design", ACM, 2010, <http://delivery.acm.org/10.1145/1860000/1854319/p365-thies.pdf>, pp. 365-376.*

Bouillet et al., MARIO: Middleware for Assembly and Deployment of Multi-Platform Flow-Based Applications, Middleware '09 Urbana Champaign, IL USA, pp. 1-7.

Gedik et al., SPADE: The System S Declarative Stream Processing Engine, SIGMOD '08, Jun. 9-12, 2008, Vancouver, BC, Canada, pp. 1123-1134.

Kimball et al., The Data Warehouse ETL Toolkit, Wiley, Chapter 7, Development, pp. 257-276, downloaded Jan. 5, 2012.

Alur et al., IBM InfoSphere DataStage Data Flow and Job Design, IBM Redbooks, Jul. 2008.

* cited by examiner

FIG. 4

402
```
(TRANSFORM projection [in] {
out:
ENTITY {
    in.lot_id; in.lot_label; in.parm_label; in.parmvalue
  }
})
```

404
```
(TRANSFORM filter [in] {
[ (SCOPE infields (in.ALL)) ]
out:
ENTITY { (FIELDS <infields>) }
HAVING {
    (AND (> in.no1 (+ in.no2 in.no3))
         (IN in.label
             ["leff_off", "leff_wdes"]))
  }
})
```

406
```
(TRANSFORM medians [in] {
[
 (SCOPE paramField
    in.(TYPE LIST<FLOAT>)) ]
out:
ENTITY    { (FIELDS <in.ALL>) }
PROCESS {
    <paramField> paramField.shortName=
        (MEDIAN paramField)
  }
})
```

408
```
(TRANSFORM join [in1, in2] {
[ (SCOPE infields1 (in1.ALL))
  (SCOPE infields2 (in2.ALL))
  (SCOPE outfields
      (infields1 OR infields2)]
out:
ENTITY { (FIELDS <outfields>) }
HAVING { (EQUIJOIN in1 in2)  }
})
```

FIG. 5

```
(TRANSFORM pivoter [in] {
[
(SCOPE valLabel (ARRAY ["leff_ratio", "leff_wdes"]) (fld (TO_IDENT shortName)))
(SCOPE parms (in."parm(.)+"))
(SCOPE infields (in.ALL))
(SCOPE outfields (infields EXCEPT parms))
]

out:
ENTITY    {
        (FIELDS <outfields>));
        <valLabel>(CREATE(FLOAT valLabel.fld))
      }
PROCESS {
      <valLabel> valLabel.fld =
            (IF (CONTAINS in.parm_label valLabel)
                  THEN in.parmvalue ELSE NULL)
      }
HAVING  {
      <valLabel>(AND_ALL &(valLabel.fld) > .005)
      }
})
```

502

CROSS-PLATFORM COMPILER FOR DATA TRANSFORMS

GOVERNMENT CONTRACT

This invention was made with Government support under Contract No.: H98230-07-C-0383 awarded by the United States Department of Defense. The Government has certain rights in this invention.

FIELD OF THE INVENTION

Embodiments of the invention generally relate to information technology, and, more particularly, to data transformation flows.

BACKGROUND OF THE INVENTION

Extract Transform Load (ETL) tools allow users to specify how to transform data from a variety of input formats to an output format that can be used in enterprise processes. Such tools allow users to define a set of transformation rules, either in graphical form or in a C-like language, resulting in a process that can be applied to input data to perform the transformations.

However, a drawback of existing ETL tools is that processes generated by them are restricted to a particular back-end. It is desirable to be able to translate ETL transformation flows to multiple back-ends.

For instance, in streaming applications (for example, on InforSphere Streams) one may need to ingest data from a relational database, combine it with streaming data (for instance, coming from sensors) and process/transform it in the Stream Processing Application Declarative Engine (SPADE) language. To do this, part of the transformation flow will have to be translated to structured query language (SQL), while part of the transformation should be translated to SPADE. This is not possible with existing tools. Furthermore, it is also desirable to automatically decide how to partition transformations across platforms (for example, what goes into SQL and what goes into SPADE) based on user-defined policies. However, this is also not possible with existing tools.

SUMMARY OF THE INVENTION

Principles and embodiments of the invention provide techniques for cross-platform compiler for data transforms. An exemplary method (which may be computer-implemented) for automatically partitioning a multi-platform data transform flow graph to one or more target output platforms, according to one aspect of the invention, can include steps of performing type inference on a transform graph, wherein the transform graph comprises one or more data transforms, automatically partitioning the transform graph to one or more target output platforms based on one or more policies, performing an optimization of the partitioned transform graph, and generating code, from the partitioned transform graph, for each set of the one or more data transforms based on the one or more target output platforms.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating data transform examples, according to an embodiment of the present invention;

FIG. 5 is a diagram illustrating data transform example of pivoting, according to an embodiment of the present invention;

DETAILED DESCRIPTION OF EMBODIMENTS

Figure 1:
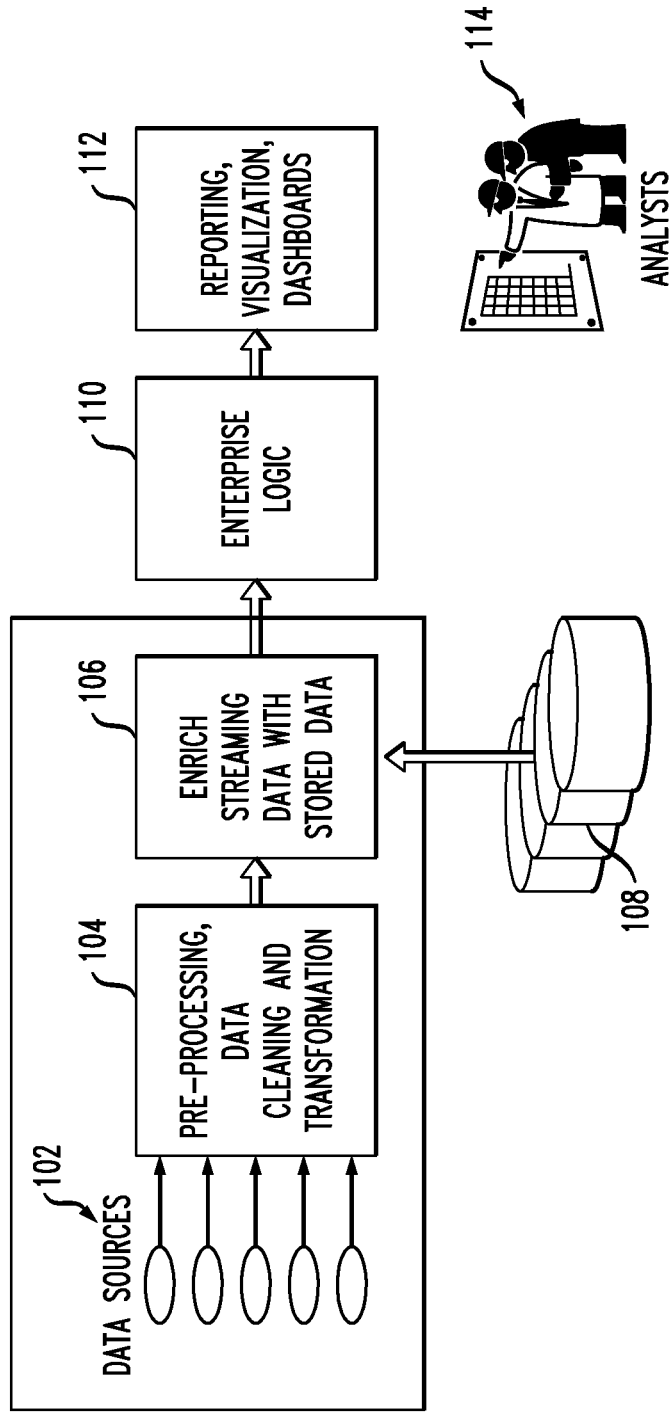
FIG. 1 is a diagram illustrating example system architecture, according to an embodiment of the present invention.

Principles of the invention include an extensible cross-platform compiler for data transforms. Accordingly, one or more embodiments of the invention include providing and using a cross-platform compiler to translate transformations to multiple back-ends (for example: SQL, SPADE, etc. or combinations thereof), partition a transformation flow automatically to separate back-ends (for example, by deciding what material is translated to SQL and what material is translated to SPADE) based on user-defined policies, and optimize transformations (where appropriate), for example, by gluing them (for instance, combining a filtering operation with a join operation to generate a single SQL statement).

As detailed herein, a data transformation meta-language can be used that supports atomic transformations (for example, selection, projection, join, filter, clean, value computations, etc.). The meta-language can also be schema independent, wherein transforms can be specified without knowing the entire schema, as well as parameterizable (for example, operators, entities, attributes and values can all be replaced by user-provided parameters). Such meta-language can also support "native" code embedding (for example, transforming the value of a field in SPADE code directly), and operate independent of how the flow of transformations is obtained (that is, without patterns or planning).

One or more embodiments of the invention, as detailed herein, include the use of a language (the ETL language for multi-platform transforms (ELM)) which permits the creation of multi-platform data transformation flows. Many application domains require the creation of applications that connect to multiple platforms. The development and maintenance of such applications presents challenges. For example, creating multi-platform applications require the insertion of adapter code, a gateway for data passing from one platform to the other. Also, multi-platform applications typically call for the creation, maintenance and updating of program artifacts written in different platform-specific languages. This can make the handling of types and schemas challenging because different platforms may have different type systems.

Further, optimization in multi-platform applications can raise design issues. For example, for any data transform T, the choice of whether T should be implemented in SPADE or SQL may depend on (i) costs associated with the transform on either platform, (ii) the choice of platform for the transforms immediately upstream and downstream of T and (iii) the capabilities of either language.

Consequently, a compiler, such as described in connection with one or more embodiments of the invention, includes the following features. A compiler supports multiple code generation back-ends (for instance, SPADE, SQL, etc.). A compiler is extensible with user-defined back-ends. To achieve this, developers can to implement a set of Java interfaces and plug-in their code into the existing compiler core (using, for example, the OSGi framework architecture).

Additionally, ETL languages noted above can be schema-independent and the data types need not be known when writing the transforms. However, most back-ends (such as, for example, SQL and SPADE) require data types to be known when the code is written. Accordingly, in one or more embodiments of the invention, the compiler processes external data type definitions depending on the back-end (for instance, stream schemas for SPADE, data definition language (DDL) descriptions for SQL, etc.) and performs type inference on the transformation flow to ensure types are properly computed. Also, the compiler can automatically partition the transformation flow between back-ends based on user-provided policies. Simple examples of a user policy can, for instance, specify that as much of the ELM transform flow as possible should be translated to SQL (for example, because a powerful database server exists) or conversely, to SPADE (for example, because a powerful InforSphere Streams infrastructure exists). Further, as noted herein, where appropriate, the compiler can automatically optimize the flow by gluing transforms together. For example, several filter operations that occur in sequence can be combined into a single filter operation. Or, as another example, a filter operation after a join can be combined to generate a single SQL statement that performs both the join and the filer (using a WHERE clause).

FIG. 1 is a diagram illustrating example system architecture, according to an embodiment of the present invention. By way of illustration, FIG. 1 depicts data sources 102, a pre-processing module 104 (used, for example, for data cleaning and transformation), an enriching module 106 used, for example, enriching streaming data with stored data from a database 108. FIG. 1 also depicts an enterprise logic module 110 and a reporting module 112 (including, for example, visualizations, dashboards, etc.), and (optionally, for completeness) analysts 114.

In a typical/example enterprise application, data from different data sources will be combined, transformed and processed to a format that is consumable by enterprise visualization tools such as dashboards. In the example depicted in FIG. 1, streaming sensor data goes through an initial stage of data pre-processing and cleaning (for example, dropping invalid values, using interpolation to insert missing values, etc.), after which it is combined with historical data from the existing database/warehouse infrastructure (as an example, current streaming data maybe compared against models of historical data to determine deviations or anomalies). The combined static and streaming data is then fed through a set of transformations derived from the enterprise logic of the enterprise and then fed into visualization tools. This example covers the specification and compilation of data transformations up to and excluding the reporting component depicted in FIG. 1.

As detailed herein, in one or more embodiments of the invention, writing multi-platform flows includes writing programs at a higher abstraction level, deciding which components go to which platform, and connecting components on different platforms. In achieving these (and other) objectives, one or more embodiments of the invention use a compiler. The compiler takes a flow of transforms at the input and produces SPADE, SQL, etc. code at the output based on one or more policies.

Further, as additionally described herein, a compile can partition and glue transforms together based on a policy description. Partitioning includes deciding which transforms go into which language. Gluing includes generating a block of code from multiple transforms. One example includes group filtering and projection transforms with the SQL query that fetches the data from the database. Additional description is provided, for example, in connection with FIG. 2.

Figure 2:
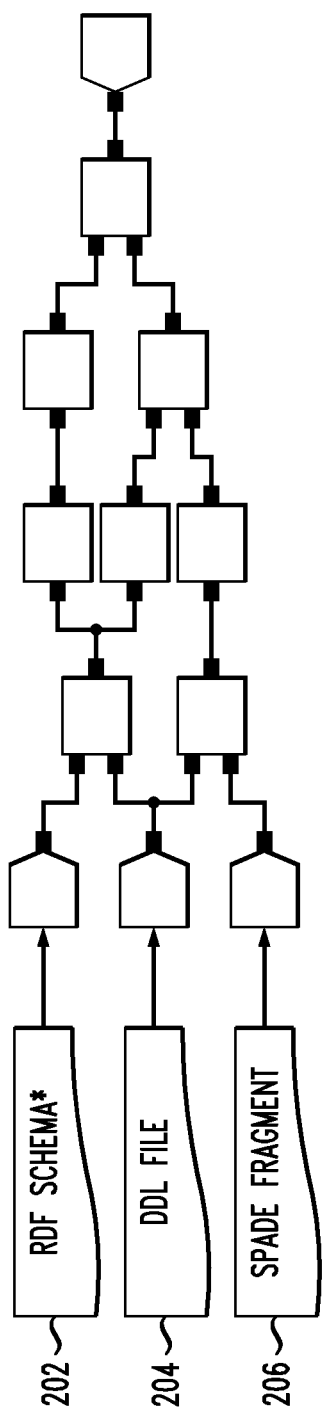
FIG. 2 is a diagram illustrating the conceptual structure of a transformation flow in an ETL language for multi-platform transforms (ELM), according to an embodiment of the present invention.

FIG. 2 is a diagram illustrating the conceptual structure of a transformation flow in an ETL language for multi-platform transforms (ELM) (examples of which are presented in FIG. 4 and FIG. 5, where sources are specified either as streaming sources (for example, using a stream processing language such as SPADE), database sources (using the Data Definition Language (DDL) subset of SQL), or other data source types (for example, resource description framework (RDF))), according to an embodiment of the present invention. By way of illustration, FIG. 2 depicts RDF schema input 202, DDL file input 204, and SPADE fragment input 206.

As described herein, and by way of example, a developer may need to write programs using heterogeneous data sources such as 202, 204 and 206 (static and dynamic, for example), transformations such as joins, selections, projections, data pivoting, data sinks and other custom transforms as defined by a developer, and a cross-platform ETL transform language such as detailed herein can be used to accomplish such an objective.

Sources, as depicted in FIG. 2, can be platform-dependent fragments (for example, DDL files with table definitions, SPADE fragments with virtual streams, etc.). A compiler partitions the graph into platforms based on, for example, user-defined policies (for example, depending on how costly a join is in Warehouse/Streams) and/or platform capabilities (for example, a language is platform independent, so not everything in ELM may be available on all platforms).

Figure 3:
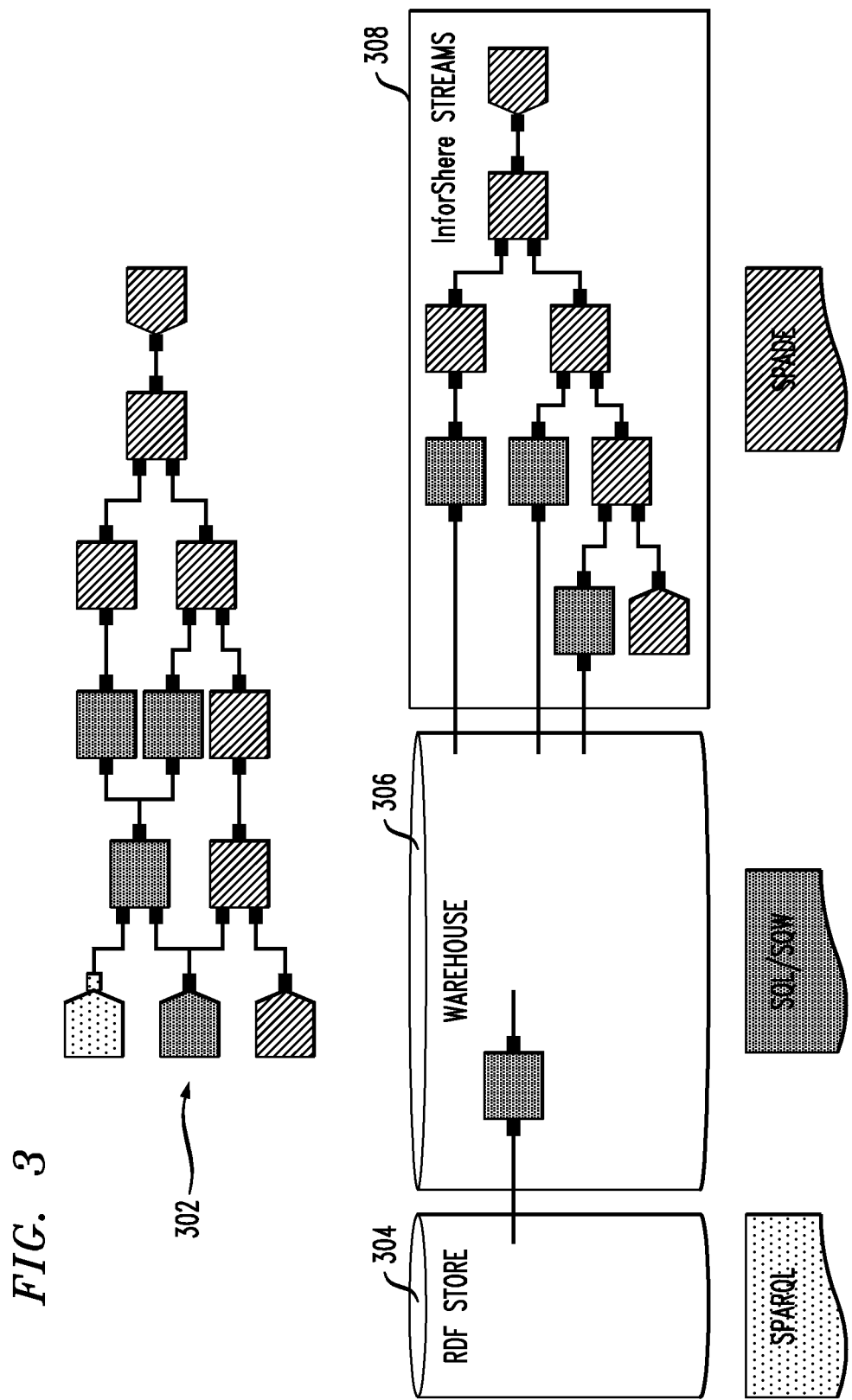
FIG. 3 is a diagram illustrating the process of translating an ELM transformation flow into transformation flows on different middleware back-ends, according to an embodiment of the present invention.

FIG. 3 is a diagram illustrating the process of translating an ELM transformation flow into transformation flows on different middleware back-ends (such as, for example, InforSphere Streams, a relational database-based system such as the IBM Data Warehouse and other back-ends such as, for instance, a resource description framework (RDF) storage backend), according to an embodiment of the present invention. By way of illustration, FIG. 3 depicts the process in which the ELM compiler takes a multi-platform transformation flow and (i) partitions it into sub-graphs from which code will be generated for different backend platforms (illustrated in FIG. 3 by different fill patterns in the components of 302); (ii) generates platform-specific code from the different parts of item 302 (for example, from the component depicted as dot-filled in FIG. 3, it generates the code for platform 304, from the components depicted as solid-filled in FIG. 3, it generates the SQL code for platform 306, and from the components depicted as diagonally-striped in FIG. 3, it generates the SPADE code for platform 308); and (iii) generates adapter code (for example, SQL-to-SPADE code that reads a table from a database and sends it as streaming data record by record).

As also described herein, one or more embodiments of the invention can include using intermediate language. Such language describes data transforms independently of the type of data source (stored/streaming). Also, the language can be tailored for easy data transform representation. By way of example, schemas can be automatically read from DDL/SPADE files, type inference ensures that schemas do not have to be repeated in the code, similar processing of multiple fields can be expressed succinctly, and changes from stored/streaming data do not require changes to the transforms.

One or more embodiments of the invention also include intermediate language operators. For example, schema operations can include create, remove, rename, "regular expression" matching on field names and types, etc. Also, by way of example, processing operations can include assignments (any arithmetic and logic expression) and/or aggregations (for example, all of those in SQL and functions in SPADE (for instance, median)). Further, one or more embodiments of the invention can include incorporating types (for example, all basic types and collections and compound types), conditions (for example, any type of logical or join expression on the input data entities), as well as "bulk" processing (for example, processing of a set of related fields in the same manner).

In connection with the teachings detailed herein, FIG. 4 is a diagram illustrating data transform examples 402, 404, 406 and 408, according to an embodiment of the present invention. Additionally, FIG. 5 is a diagram illustrating data transform example 502 of pivoting, according to an embodiment of the present invention.

Figure 6:
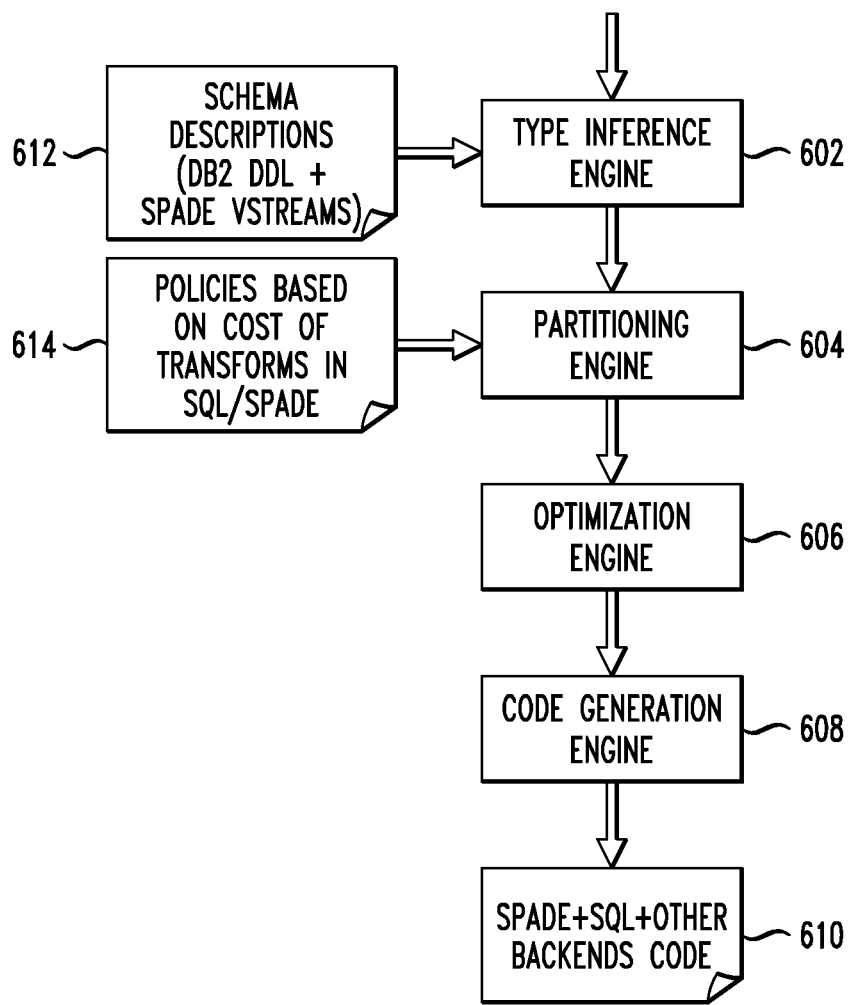
FIG. 6 is a block diagram illustrating example compiler architecture, according to an aspect of the invention.

FIG. 6 is a block diagram illustrating example compiler architecture, according to an aspect of the invention. By way of illustration, FIG. 6 depicts a type inference engine module 602 (which receives schema descriptions 612 (for example, DB2 DDL and SPADE streams)), a partitioning engine module 604 (which receives policies 614 based, for example, on cost of transforms in SQL/SPADE), an optimization engine module 606, and a code generation engine module 608, which outputs back-ends code 610 (such as, for example SPADE and SQL).

The type inference engine module 602 parses entity types from database schema/virtual stream descriptions and performs type inference on the transform graph. In this instance, type inference is performed by traversing the transform flow graph and determining the output schemas of all transforms based on the input schemas and the nature of their transforms. Unlike SPADE, for example, schemas do not have to be written down many times over. The type inference engine module also determines the input and output schemas for all transforms. The partitioning engine module 604 decides, based on dynamic policies, which transforms should be in SQL and which in SPADE, as well as minimizes overall transform "cost."

One or more embodiments of the invention, such as the embodiment depicted in FIG. 6, describes two ways of solving the partitioning problem. In the following, assume that the transform flow includes a set of transforms $T_i$, $1 \le i \le N$. Also assume the existence of a set of back-end platforms $P_j$, $1 \le j \le M$. The user policy can specify a cost for each transform $T_i$ on any platform $P_j$ as $C(T_i, P_j)$. Note that the user does not need to specify the costs of all transforms on all platforms. As an example, if one platform is always preferred over another, the preferred platform can be specified to always have a low cost. As another example, if one transform's cost is platform-independent, a default transform cost can be specified by the user. Additionally, assume that there is a user-specified cost to transition from one platform to another (for instance, to transition from InforSphere Streams to a database environment, streaming data has to be stored in the database, which implies a computational cost) as $R(P_x, P_y)$ with $1 \le x$, $y \le M$ and $x \ne y$. Also, succ(i) is used herein as the set of indexes k, $1 \le k \le N$, such that $T_k$ immediately succeeds $T_i$ in the transformation flow graph.

The first method for solving the partitioning problem is to reduce the problem to a pseudo-Boolean programming problem (an integer programming problem where the values of the variables are either 0 or 1) in the following way. Define a set of variables $X(T_i, P_j)$ for each i, j, where $X(T_i, P_j)=1$ if $T_i$ should be implemented on platform $P_j$ and 0 otherwise. The purpose of the partitioning problem is to obtain the best values for these variables such that the partitioning produces the minimum "cost" application, where cost is defined by the user as indicated above. To do this, one or more embodiments of the invention include using equation (1)

$$\sum_{j=1}^{M} X(T_i, P_j) = 1$$

for each i between 1 and N (this equation specifies that each transform is implemented on one and only one platform). If there are any transforms $T_i$ that cannot be implemented under a platform $P_j$ (for instance, a median calculation cannot be implemented in a relational database system that does not support this function), equation (2) $X(T_i, P_j)=0$ is added for any such cases. Also, the cost function (3) is defined as:

$$\sum_{i=1}^{N} \sum_{j=1}^{M} X(T_i, P_j) \cdot C(T_i, P_j) + \sum_{i=1}^{N} \sum_{k \in succ(i)} \sum_{j=1}^{M} \sum_{l=1, l \ne j}^{M} X(T_i, P_j) \cdot X(T_k, P_l) \cdot R(P_j, P_l).$$

The first part of this cost function represents the cost of implementing each transform in the flow to its respective platform. The second part of this cost function represents the costs of transitioning from one platform to another when two transforms $T_i$ and $T_k$ that succeed each other in the flow are implemented on different platforms $P_j$ and $P_l$. Accordingly, the partitioning problem can be formulated as a 0-1 integer programming problem (or pseudo-Boolean problem) by requiring the cost function (3) be minimized under the constraints imposed by the sets of equations (1) and (2). The problem can be solved by any integer programming solver.

The second method for solving the partitioning problem is an approximate method as follows:

A) Traverse the graph in topological order starting from the sources; and

B) For each transform $T_i$ in the traversal, iterate through platforms and pick platform $P_j$ that gives the minimum cost in the traversal so far (computed using the same function as (3) above, but only for transforms that were visited so far).

Additionally, with respect to FIG. 6, the optimization engine module 606 can change the generated code for each platform in one of the following ways:

A) Fuse two or more transforms when this operation can be performed. Examples can include: two filters that succeed each other can be fused into a single filter; a join succeeded by a filter can be written as a single operator in SPADE and as a single query in SQL; any chain of transforms with a single output that will be implemented in SQL can be fused into a single query. The determination of how transforms are fused can be made based on static analysis of the ELM transform code, in the context of the capabilities of the backend platform chosen for that transform (for example, InforSphere Streams SPADE can specify a join condition and a filtering condition in a single operator, as can SQL).

B) Invert the order of two transforms. This is a well-known optimization technique, through which the order of a join followed by a selection can be reversed to minimize the cost of the join operation. It is available both in SPADE and SQL, as long as the select operation.

C) Optimize joins between streaming and static data. Assuming a set of joins in which some data sources are static and some are streaming, the purpose of this step is to determine the optimal order in which the joins are to be performed. For example, one or more embodiments of the invention include using a left-deep join optimization algorithm, where cardinality estimates on static data are derived from relational database statistics, and cardinality estimates on streaming data are derived from measured streaming data rates.

Using ELM, one or more embodiments of the invention can write a single program that uses stored and streaming data and generates program code (for example, SPADE and SQL program code). As depicted, for example, in FIG. 6, an ELM program can be modeled as a flow of data sources and transforms. The ELM compiler can read and parse an ELM program, as well as read any schema descriptions for sources and verify that data types match across the entire flow (type inference). As noted above, based on user-defined policies, the compiler decides, for each transform, on which platform it will be implemented (partitioning) and generates code for each platform (in this scenario, SPADE programs and SQL queries (code generation)). Further, the compiler can generate adapter code to serve as a gateway between platforms.

Figure 7:
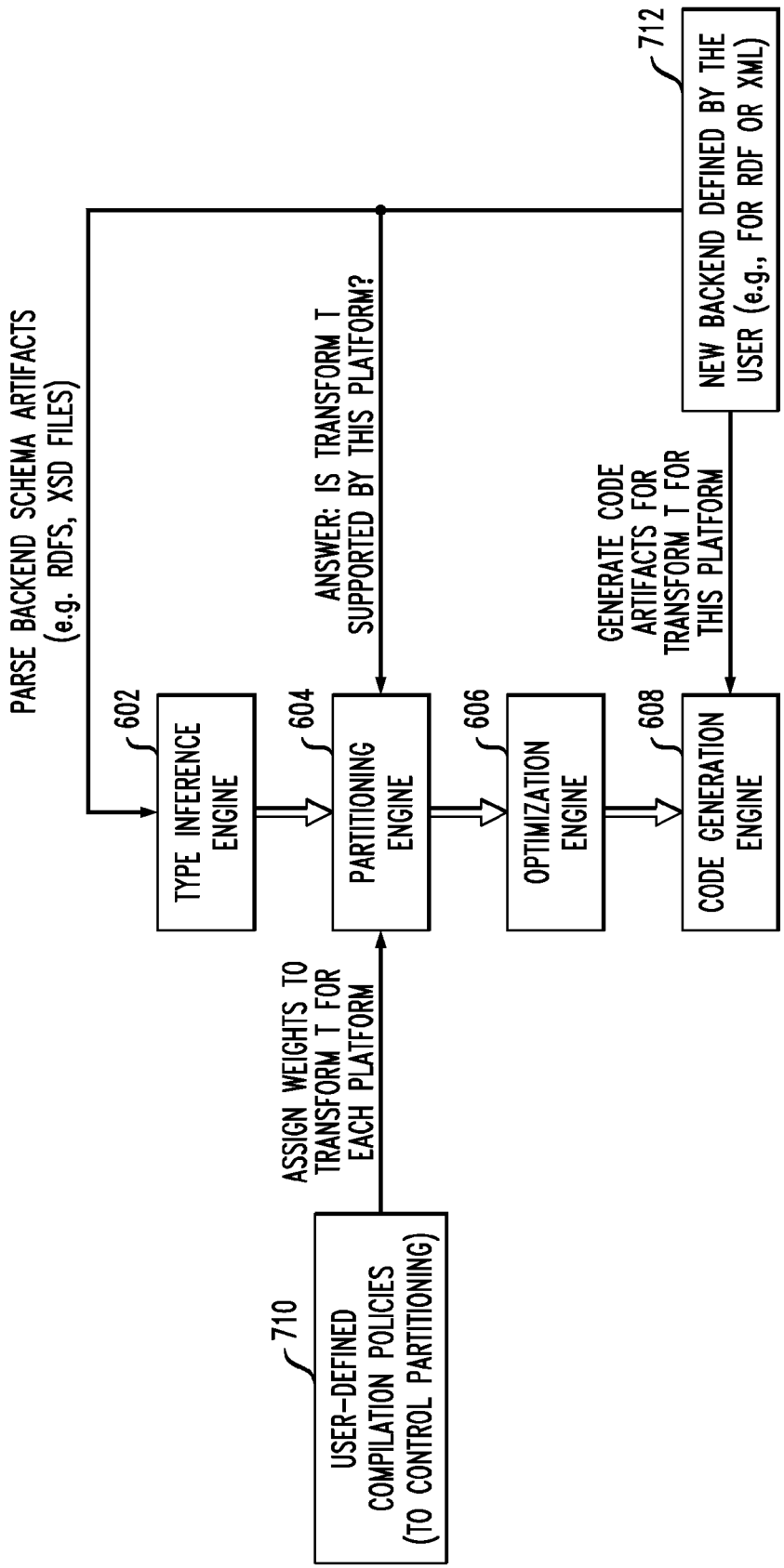
FIG. 7 is a block diagram illustrating compiler architecture extensibility, according to an aspect of the invention.

FIG. 7 is a block diagram illustrating compiler architecture extensibility, according to an aspect of the invention. By way of illustration, FIG. 7 depicts a type inference engine module 602, a partitioning engine module 604 (which receives user-defined compilation policies 710 to control partitioning) which assigns weights to transform T for each platform, an optimization engine module 606, and a code generation engine module 608. Also, FIG. 7 depicts a new back-end 712 defined by the user (for example, for RDF or XML). Code artifacts are generated for transform T for the new back-end platform, and parsed back-end schema artifacts (for example, RDFS, XSD files, etc.) are provided to the type inference engine module. Further, in connection with the partitioning engine module, one or more embodiments of the invention determine whether transform T is supported by the new back-end platform.

Additionally, in one or more embodiments of the invention, ELM features can also include scopes, which are either an array of constants or of fields. Scopes are useful when the same operation needs to be applied to a set of fields or to a set of values. To apply the same processing expression to all fields selected by a scope, one or more embodiments of the invention can include placing the name of the scope between angle brackets in front of the expression. Scopes offer an effective way of developing transforms that are largely independent of the schema of incoming tuples. More specifically, scopes allow a transform to require that some fields exist in the input schema, without knowing all fields and their types a priori, such as in SPADE and SQL.

Another feature of ELM includes the ability to embed platform native code within ELM transforms. This allows platform-specific extensions to the language, but limits the possible implementations of the transform to the specific platform on which the native code can be executed.

Figure 8:
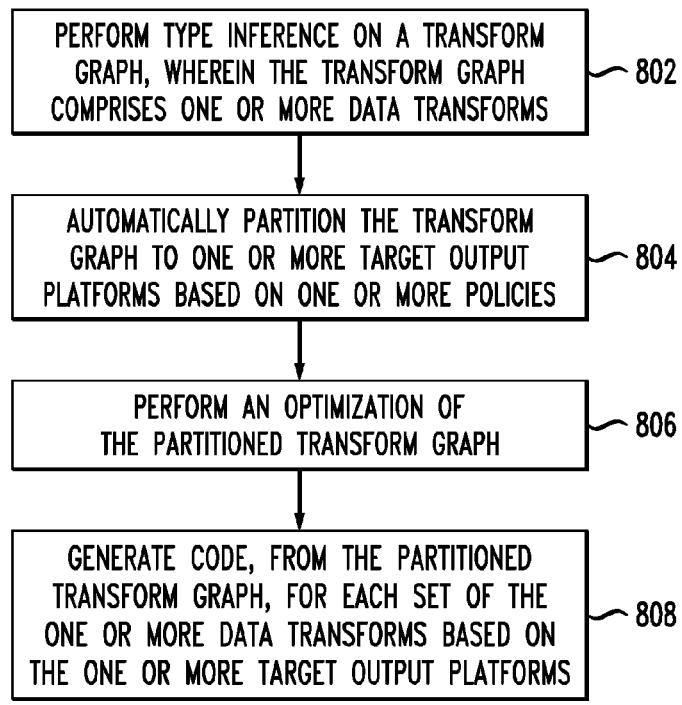
FIG. 8 is a flow diagram illustrating techniques for automatically partitioning a multi-platform data transform flow graph to one or more target output platforms, according to an embodiment of the invention.

FIG. 8 is a flow diagram illustrating techniques for automatically partitioning a multi-platform data transform flow graph to one or more target output platforms, according to an embodiment of the present invention. Step 802 includes performing type inference on a transform graph, wherein the transform graph comprises one or more data transforms. This step can be carried out, for example, using a type inference engine module. Performing type inference on a transform graph can include parsing entity types from a database schema and/or virtual stream descriptions. Performing type inference can also include determining each input and output schema for all data transforms, as well as verifying schema compatibility over the transform graph of data transforms.

Step 804 includes automatically partitioning the transform graph to one or more target output platforms based on one or more policies. This step can be carried out, for example, using a partitioning engine module. The data transforms can be expressed in an Extract Transform Load (ETL) language for multi-platform transforms (ELM) grammar, and data sources can be expressed in SPADE or structured query language (SQL) data definition language (DDL). Additionally, each data transform has a cost on each target platform and partitioning is performed to minimize an overall program cost. A data transform cost can be expressed, for example, through user policies, a data transform cost can be derived from target platform capabilities, and the overall program cost can include costs for connectors between platforms.

By way of example, one way to model the fact that not all transforms are supported by all platforms is to assign (through automated analysis of the ELM code) prohibitively high costs for transforms T on platforms P that do not support them. This assures that the optimization problem will not choose platform P for transform T because it is trying to minimize cost. This works especially well for method 2 of solving the partitioning problem (as detailed above), but is not needed in method 1 because the set of equations (2) can be written.

Step 806 includes performing an optimization of the partitioned transform graph. This step can be carried out, for example, using an optimization engine module. Performing an optimization can include fusing one or more of the one or more data transforms if fusing of one or more data transforms is appropriate. Performing an optimization can additionally include, for example, determining how to optimize one or more joins between stored and streaming data.

Step 808 includes generating code, from the partitioned transform graph, for each set of the one or more data transforms based on the one or more target output platforms. This step can be carried out, for example, using a code generation engine module. Generating code can include generating adapter code to facilitate data flow between the one or more target output platforms. Additionally, generating code for each set of data transforms based on the target output platforms can include automatically generating bridging and mediation code between two or more output platforms. Also, in one or more embodiments of the invention, connectors can use an adapter toolkit as well as custom user-defined operators (UDOPs).

In one or more embodiments of the invention, as detailed herein, the target output platforms can include SPADE, SQL, and/or a combination thereof. Further, the techniques depicted in FIG. 8 can include assigning a cost to each data transform for each target output platform. By way of example, consider C(Ti, Pj) here, which was detailed above. The user has the option of: (1) specifying a cost for each transform and for each platform; (2) specifying a default cost for a transform (for any platform) and only overriding it for a limited set of platforms; (3) specifying a default "platform" cost (that is, a default cost for any transform implemented on that platform); (4) the relevant equations described herein also work if the user does not associate a numeric cost with each transform on each platform, but rather comparative qualitative statements (for example, $T_i$ is more expensive on platform $P_y$ than platform $P_x$. In this case, one or more embodiments of the invention include assigning numeric values to the platforms based on this comparative statements and then applying the same method as described in relevant portions above).

The techniques depicted in FIG. 8 can also include determining whether each data transform is supported by each target output platform. This determination is made by analyzing the ELM code associated with each transform. For instance, the "median" aggregation function is not a supported SQL aggregation function. Accordingly, if there is a transform that computes the median of some values, then that transform cannot be implemented in SQL; however, SPADE supports median as aggregation, so the transform can be implemented in SPADE.

Additionally, one or more embodiments of the invention can include using scopes to apply an operation to a set of multiple fields or to a set of multiple values.

The techniques depicted in FIG. 8 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a type inference engine module, a partitioning engine module, an optimization engine module, and a code generation engine module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 9:
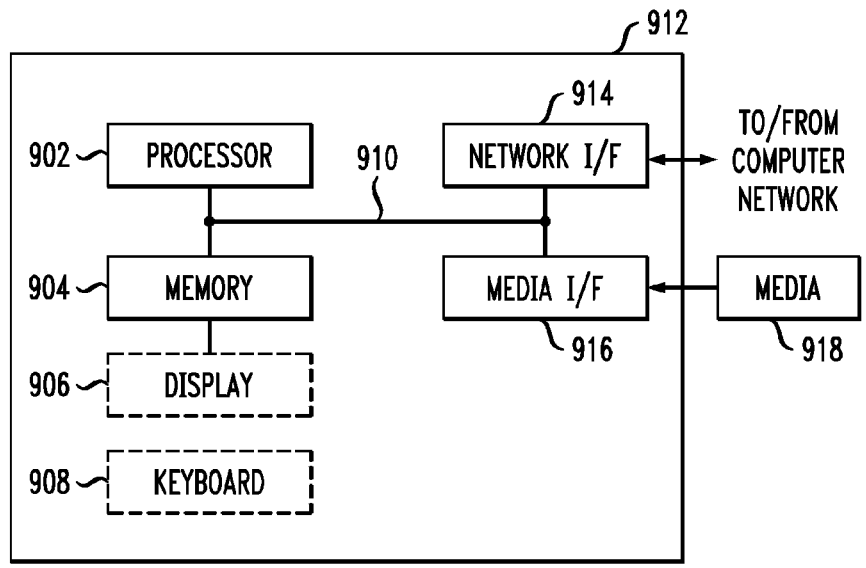
FIG. 9 is a system diagram of an exemplary computer system on which at least one embodiment of the invention can be implemented.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1, FIG. 6 and FIG. 7. The method steps can then be carried out using the distinct software modules and/or sub-modules of the system, as described above, executing on one or more hardware processors 902. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, translating transformations to multiple back-ends.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for automatically partitioning a multi-platform data transform flow graph to multiple target output platforms, wherein the method comprises:
   performing type inference on a transform graph, wherein the transform graph comprises one or more data transforms;
   automatically partitioning the transform graph into multiple sub-graphs, wherein the multiple sub-graphs correspond to at least two target output platforms, and wherein the at least two target output platforms comprise (i) a stream programming language, and (ii) a structured query language;
   performing an optimization of the partitioned transform graph; and generating multiple distinct portions of platform-specific code from the partitioned transform graph, wherein the multiple distinct portions of platform-specific code comprises platform-specific code for each set of the one or more data transforms across the multiple sub-graphs based on the at least two target output platforms associated with each of the multiple sub-graphs.

2. The method of claim 1, wherein said generating comprises generating adapter code to facilitate data flow between the multiple target output platforms.

3. The method of claim 1, wherein performing an optimization of the partitioned transform graph comprises fusing one or more of the one or more data transforms if fusing of one or more data transforms is appropriate.

4. The method of claim 1, wherein performing type inference on a transform graph comprises parsing one or more entity types from at least one of a database schema and one or more virtual stream descriptions.

5. The method of claim 1, wherein performing type inference on a transform graph comprises determining each input and output schema for all one or more data transforms.

6. The method of claim 1, wherein performing type inference on a transform graph comprises verifying schema compatibility over the transform graph of one or more data transforms.

7. The method of claim 1, wherein the one or more data transforms are expressed in an Extract Transform Load (ETL) language for multi-platform transforms (ELM) grammar, and wherein data sources are expressed in Stream Processing Application Declarative Engine (SPADE) programming language or structured query language (SQL) data definition language (DDL).

8. The method of claim 1, wherein each data transform has a cost on each target platform and partitioning is performed to minimize an overall program cost.

9. The method of claim 8, wherein a data transform cost is expressed through one or more user policies and is derived from one or more target platform capabilities.

10. The method of claim 8, wherein the overall program cost comprises costs for one or more connectors between two or more platforms.

11. The method of claim 1, wherein said generating comprises automatically generating bridging and mediation code between two or more output platforms.

12. The method of claim 1, wherein the stream programming language comprises Stream Processing Application Declarative Engine (SPADE) programming language.

13. The method of claim 1, further comprising assigning a cost to each data transform for each target output platform.

14. The method of claim 1, further comprising determining whether each data transform is supported by each target output platform.

15. The method of claim 1, further comprising using one or more scopes to apply an operation to a set of multiple fields or to a set of multiple values.

16. The method of claim 1, further comprising providing a system, wherein the system comprises one or more distinct software modules, each of the one or more distinct software modules being embodied on a tangible computer-readable recordable storage medium, and wherein the one or more distinct software modules comprise a type inference engine module, a partitioning engine module, an optimization engine module and a code generation engine module executing on a hardware processor.

17. A computer program product comprising a tangible computer readable recordable storage medium including computer useable program code for automatically partitioning a multi-platform data transform flow graph to multiple target output platforms, the computer program product including:
  computer useable program code for performing type inference on a transform graph, wherein the transform graph comprises one or more data transforms;
  computer useable program code for automatically partitioning the transform graph into multiple sub-graphs, wherein each of the multiple sub-graphs correspond to at least two target output platforms, and wherein the at least two target output platforms comprise (i) a stream programming language, and (ii) a structured query language;
  computer useable program code for performing an optimization of the partitioned transform graph; and computer useable program code for generating multiple distinct portions of platform-specific code from the partitioned transform graph, wherein the multiple distinct portions of platform-specific code comprises platform-specific code for each set of the one or more data transforms across the multiple sub-graphs based on the at least two target output platforms associated with each of the multiple sub-graphs.

18. The computer program product of claim 17, wherein said generating comprises computer useable program code for generating adapter code to facilitate data flow between the multiple target output platforms.

19. The computer program product of claim 17, wherein the computer useable program code for performing type inference on a transform graph comprises computer useable program code for determining each input and output schema for all one or more data transforms.

20. The computer program product of claim 17, wherein each data transform has a cost on each target platform and partitioning is performed to minimize an overall program cost.

21. The computer program product of claim 17, wherein the one or more data transforms are expressed in an Extract Transform Load (ETL) language for multi-platform transforms (ELM) grammar, and wherein data sources are expressed in Stream Processing Application Declarative Engine (SPADE) programming language or structured query language (SQL) data definition language (DDL).

22. A system for automatically partitioning a multi-platform data transform flow graph to multiple target output platforms, comprising:
  a memory; and
  at least one processor coupled to the memory and operative to:
    perform type inference on a transform graph, wherein the transform graph comprises one or more data transforms;
    automatically partition the transform graph into multiple sub-graphs, wherein the multiple sub-graphs correspond to at least two target output platforms, and wherein the at least two target output platforms comprise (i) a stream programming language, and (ii) a structured query language;
    perform an optimization of the partitioned transform graph; and
    generate multiple distinct portions of platform-specific code from the partitioned transform graph, wherein the multiple distinct portions of platform-specific code comprises platform-specific code for each set of the one or more data transforms across the multiple sub- graphs based on the at least two target output platforms associated with each of the multiple sub-graphs.

23. The system of claim 22, wherein the at least one processor coupled to the memory and operative to generate code is further operative to generate adapter code to facilitate data flow between the multiple target output platforms.

24. The system of claim 22, wherein the one or more data transforms are expressed in an Extract Transform Load (ETL) language for multi-platform transforms (ELM) grammar, and wherein data sources are expressed in Stream Processing Application Declarative Engine (SPADE) programming language or structured query language (SQL) data definition language (DDL).

25. The system of claim 22, wherein each data transform has a cost on each target platform and partitioning is performed to minimize an overall program cost.

* * * * *